No. 771,479.

Patented October 4, 1904.

UNITED STATES PATENT OFFICE.

JOHN W. LEWIS, OF BOKOSHE, INDIAN TERRITORY.

ARTIFICIAL STONE.

SPECIFICATION forming part of Letters Patent No. 771,479, dated October 4, 1904.

Application filed June 20, 1904. Serial No. 213,434. (No specimens.)

*To all whom it may concern:*

Be it known that I, JOHN W. LEWIS, a citizen of the United States, residing at Bokoshe, in the Choctaw Nation, Indian Territory, have invented certain new and useful Improvements in Artificial Stone; and I do declare the following to be a full, clear, and exact description of the invention, such as will enable others skilled in the art to which it appertains to make and use the same.

This invention relates to a new and useful composition adapted to be utilized as an artificial stone; and it consists in the provision of various ingredients which when compounded in the proportions to be hereinafter fully described will produce a marble-like material having great durability and impervious to water.

In carrying out my invention I utilize Portland cement, salt, sand, alum, rice-water, plaster-of-paris, Spanish whiting, acacia, (gum-arabic,) boiled linseed-oil, and Prussian blue, and in making the composition the ingredients are used in the following proportions: To thirty-five pounds of Portland cement is added forty-three pounds of common sand, to which is added two pounds of common salt, which is added for the purpose of preventing the hardening of the mixture at too early a period, and to this mixture four pounds of alum are thoroughly mixed with three pounds of rice-water, whereby a beautifying marble-like appearance may be afforded. The rice-water used is prepared by boiling the rice in the proportion of four pounds of the same to four gallons of water until the rice is thoroughly cooked, after which the water is strained and ready for use. To the mixture is added five pounds of plaster-of-paris, with which two pounds of Spanish whiting and two pounds each of acacia (gum-arabic) and boiled linseed-oil are mixed, together with a quarter of a pound of Prussian blue. The plaster-of-paris gives the material a sufficient hardness, while the acacia and linseed-oil toughen the material and make it when dry impervious to water, and the Prussian blue is simply added as a pigment for giving the composition a semblance to blue marble, although any other coloring-matter may be added to the compound for giving imitations of various colors of stones.

I have found from experiment that by the compounding of the various ingredients described and in the proportions set forth I am able to produce a material which will be durable, tough, and which will closely resemble marbles or stones of various kinds and which will be impervious to water.

Having thus fully described my invention, what I claim as new, and desire to secure by Letters Patent, is—

An artificial stone comprising the following ingredients in the proportions given, thirty-five pounds of Portland cement, forty-three pounds of common sand, two pounds of salt, four pounds of alum, three pounds of rice-water, five pounds of plaster-of-paris, two pounds of Spanish whiting, two pounds of acacia, two pounds of boiled linseed-oil, and a quarter of a pound of Prussian blue, compounded as herein described and set forth.

In testimony whereof I hereunto affix my signature in presence of two witnesses.

JOHN W. LEWIS.

Witnesses:
E. W. GRABOWSKI,
J. O. BUFFINGTON.